United States Patent
Huang (10) Patent No.: US 9,762,427 B2
(45) Date of Patent: Sep. 12, 2017

(54) CODE MODULATION AND DEMODULATION METHODS, APPARATUSES, AND SYSTEM

(71) Applicant: Huawei Technologies Co., Ltd., Shenzhen (CN)

(72) Inventor: Yuanda Huang, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

(21) Appl. No.: 15/295,684

(22) Filed: Oct. 17, 2016

(65) Prior Publication Data
US 2017/0041179 A1 Feb. 9, 2017

Related U.S. Application Data (63) Continuation of application No. PCT/CN2014/075596, filed on Apr. 17, 2014.

(51) Int. Cl.
*H04L 27/36* (2006.01)
*H04L 27/34* (2006.01)
(Continued)

(52) U.S. Cl.
CPC .......... *H04L 27/361* (2013.01); *H04L 7/0037* (2013.01); *H04L 27/3411* (2013.01); *H04L 27/3455* (2013.01); *H04L 27/38* (2013.01)

(58) Field of Classification Search
CPC ..... H04L 27/361; H04L 27/38; H04L 7/0037; H04L 27/3455; H04L 27/3411
See application file for complete search history.

(56) References Cited

U.S. PATENT DOCUMENTS

| 4,613,976 A | 9/1986 | Sewerinson et al. |
| 6,233,712 B1 * | 5/2001 | Rhee ............... H04L 1/0045 375/265 |

(Continued)

FOREIGN PATENT DOCUMENTS

| CN | 1309858 A | 8/2001 |
| CN | 1189380 A2 | 3/2002 |

(Continued)

OTHER PUBLICATIONS

Randel et al., "Study of Multicarrier Offset-QAM for Spectrally Efficient Coherent Optical Communications," ECOC Technical Digest, 37th European Conference and Exhibition on Optical Communication, Institute of Electrical and Electronics Engineers, New York, New York (2011).

(Continued)

*Primary Examiner* — Daniel Washburn
*Assistant Examiner* — Amneet Singh
(74) *Attorney, Agent, or Firm* — Leydig, Voit & Mayer, Ltd.

(57) ABSTRACT

The present invention relates to the field of signal processing, and discloses code modulation and demodulation methods, apparatuses, and a system, so as to reduce an envelope fluctuation degree of a signal and improve system performance. A specific implementation method includes: receiving, by a sending apparatus, N channels of bit signals, and performing serial-to-parallel conversion on any channel of bit signal of the N channels of bit signals, to generate two channels of first bit signals; performing delay control on the two channels of first bit signals, to generate two channels of code bit signals; performing QAM mapping on the two channels of code bit signals and other N−1 channels of bit signals, to generate a channel of quadrature electrical signal and a channel of in-phase electrical signal; modulating the (Continued)

quadrature electrical signal and the in-phase electrical signal, to obtain a transmit signal.

8 Claims, 5 Drawing Sheets

(51) Int. Cl.
  *H04L 7/00* (2006.01)
  *H04L 27/38* (2006.01)

(56) References Cited

U.S. PATENT DOCUMENTS

| | | | | |
|---|---|---|---|---|
| 6,621,880 | B1* | 9/2003 | Niesen | H04L 7/0332 375/340 |
| 6,647,074 | B2 | 11/2003 | Citta et al. | |
| 2001/0001008 | A1 | 5/2001 | Dent | |
| 2002/0126763 | A1* | 9/2002 | Jeong | H03M 13/2957 375/295 |
| 2006/0256895 | A1* | 11/2006 | Cho | H04L 27/2332 375/332 |
| 2008/0049859 | A1* | 2/2008 | Choi | H04L 1/0041 375/261 |
| 2009/0042511 | A1* | 2/2009 | Malladi | H04L 5/023 455/62 |
| 2011/0176815 | A1 | 7/2011 | Frankel et al. | |

FOREIGN PATENT DOCUMENTS

| | | |
|---|---|---|
| GR | 1003877 B | 4/2002 |
| WO | WO 9953663 A1 | 10/1999 |
| WO | WO 2010065100 A2 | 6/2010 |

OTHER PUBLICATIONS

Magarini et al., "Impact of Nonideal Phase Reference on Soft Decoding of Differentially Encoded Modulation," IEEE Photonics Technology Letters, vol. 24, Issue 23, pp. 2179-2182, Institute of Electrical and Electronics Engineers, New York, New York (Dec. 1, 2012).

* cited by examiner

CODE MODULATION AND DEMODULATION METHODS, APPARATUSES, AND SYSTEM

CROSS-REFERENCE TEMPLATES

This application is a continuation of International Application No. PCT/CN2014/075596, filed on Apr. 17, 2014, the disclosure of which is hereby incorporated by reference in its entirety.

TECHNICAL FIELD

The present invention relates to the field of signal processing, and in particular, to code modulation and demodulation methods, apparatuses, and a system.

BACKGROUND

Currently, because a quadrature amplitude modulation (QAM) technology can provide higher spectrum utilization efficiency, currently the quadrature amplitude modulation technology has already been widely applied to various digital communications fields. However, compared with quadrature phase shift keying (QPSK) modulation used in current 100 G transmission, higher order QAM modulation has more amplitudes and phases, resulting in increased envelope fluctuation of a modulated signal, so that nonlinear effects of a signal during data link transmission are enhanced and transmission performance of an entire system is affected. In addition, because the higher order QAM modulation has more phases than the QPSK modulation, when a receiver performs phase retrieval on a received signal, cycle skipping is more frequent, thereby affecting system performance.

For the foregoing content, in the prior art, a signal sending and receiving method of offset-quadrature amplitude modulation (Offset-QAM) is generally used to resolve the foregoing problem. Specifically, a transmit end transmits a signal by dividing the signal into multiple subcarriers, and when each subcarrier is transmitted, a quadrature electrical signal and an in-phase electrical signal are offset by half a baud period and then an optical subcarrier is modulated. In this case, although an envelope fluctuation degree of a signal is reduced to some extent, a signal spectrum is not essentially improved, and a cycle skipping effect caused when a receiver performs phase retrieval on a received signal cannot be improved either.

SUMMARY

Embodiments of the present invention provide code modulation and demodulation methods, apparatuses, and a system, so as to reduce an envelope fluctuation degree of a signal and improve system performance.

To achieve the foregoing objective, the following technical solutions are used in the embodiments of the present invention:

According to a first aspect, a sending apparatus is provided, including:

a conversion module, configured to: receive N channels of bit signals, and perform serial-to-parallel conversion on any channel of bit signal of the N channels of bit signals, to generate two channels of first bit signals, where N is a natural number greater than 1;

a delay module, configured to: perform delay control on the two channels of first bit signals generated by the conversion module, to generate two channels of code bit signals, where the two channels of code bit signals differ by one clock cycle T;

a mapping module, configured to: perform QAM quadrature amplitude modulation mapping on the two channels of code bit signals generated by the delay module and other N−1 channels of bit signals, to generate a channel of quadrature electrical signal and a channel of in-phase electrical signal, where four quadrants of the in-phase electrical signal and the quadrature electrical signal are determined by bit values that correspond to the two channels of code bit signals at a same moment; and a modulation module, configured to: modulate the quadrature electrical signal and the in-phase electrical signal that are generated by the mapping module, to obtain a transmit signal.

In a first possible implementation manner of the first aspect, the delay module is specifically configured to: delay either channel of first bit signal of the two channels of first bit signals by one clock cycle T, to generate a channel of code bit signal, and use the other first bit signal of the two channels of first bit signals as the other channel of code bit signal.

According to a second aspect, a receiving apparatus is provided, including:

a demodulation module, configured to: receive a transmit signal sent by a sending apparatus, and demodulate the transmit signal, to generate a channel of quadrature electrical signal and a channel of in-phase electrical signal;

a determining module, configured to: perform determining and QAM quadrature amplitude modulation demapping on the quadrature electrical signal and the in-phase electrical signal that are generated by the demodulation module, to obtain N+1 channels of signals, where N is a natural number greater than 1, the N+1 channels of signals include two channels of code bit signals, and four quadrants of the in-phase electrical signal and the quadrature electrical signal are determined by bit values that correspond to the two channels of code bit signals at a same moment; and a decoding module, configured to: decode the two channels of code bit signals in the N+1 channels of signals obtained by the determining module, to generate a channel of bit signal, and use the bit signal and other N−1 channels of signals as output signals.

In a first possible implementation manner of the second aspect, the demodulation module is specifically configured to: receive the transmit signal sent by the sending apparatus, and perform frequency mixing on the transmit signal and a local-frequency signal, to generate a channel of quadrature analog signal and a channel of in-phase analog signal; and separately perform analog-to-digital conversion on the channel of quadrature analog signal and the channel of in-phase analog signal, to obtain the quadrature electrical signal and the channel of in-phase electrical signal.

In a second possible implementation manner of the second aspect, the decoding module is specifically configured to: perform parallel-to-serial conversion on the two channels of code bit signals in the N+1 channels of signals obtained by the determining module, to generate the channel of bit signal, and use the bit signal and the other N−1 channels of signals as the output signals.

In a third possible implementation manner of the second aspect, the decoding module includes:

a delay unit, configured to: delay, by one clock cycle T, a channel of code bit signal that is not delayed in the two channels of code bit signals in the N+1 channels of signals obtained by the determining module, to obtain a channel of first code bit signal, and use the other channel of code bit signal of the two channels of code bit signals as the other channel of first code bit signal; and a conversion unit, configured to: perform parallel-to-serial conversion on the two first channels of code bit signals, to generate the channel of bit signal, and use the bit signal and the other N−1 channels of signals as the output signals.

According to a third aspect, a code modulation method is provided, including:

receiving, by a sending apparatus, N channels of bit signals, and performing serial-to-parallel conversion on any channel of bit signal of the N channels of bit signals, to generate two channels of first bit signals, where N is a natural number greater than 1;

performing delay control on the two channels of first bit signals, to generate two channels of code bit signals, where the two channels of code bit signals differ by one clock cycle T;

performing QAM quadrature amplitude modulation mapping on the two channels of code bit signals and other N−1 channels of bit signals according to a preset QAM quadrature amplitude modulation mapping rule, to generate a channel of quadrature electrical signal and a channel of in-phase electrical signal, where four quadrants of the in-phase electrical signal and the quadrature electrical signal are determined by bit values that correspond to the two channels of code bit signals at a same moment; and modulating the quadrature electrical signal and the in-phase electrical signal, to obtain a transmit signal.

In a first possible implementation manner of the third aspect, the performing delay control on the two channels of first bit signals, to generate two channels of code bit signals specifically includes:

delaying either channel of first bit signal of the two channels of first bit signals by one clock cycle T, to generate a channel of code bit signal; and using the other first bit signal of the two channels of first bit signals as the other channel of code bit signal.

According to a fourth aspect, a code demodulation method is provided, including:

receiving, by a receiving apparatus, a transmit signal sent by a sending apparatus, and demodulating the transmit signal, to generate a channel of quadrature electrical signal and a channel of in-phase electrical signal;

performing determining and QAM quadrature amplitude modulation demapping on the quadrature electrical signal and the in-phase electrical signal, to obtain N+1 channels of signals, where N is a natural number greater than 1, the N+1 channels of signals include two channels of code bit signals, and four quadrants of the in-phase electrical signal and the quadrature electrical signal are determined by bit values that correspond to the two channels of code bit signals at a same moment; and decoding the two channels of code bit signals in the N+1 channels of signals, to generate a channel of bit signal, and using the channel of bit signal and other N−1 channels of signals as output signals.

In a first possible implementation manner of the fourth aspect, the receiving, by a receiving apparatus, a transmit signal, and demodulating the transmit signal, to generate a channel of quadrature electrical signal and a channel of in-phase electrical signal specifically includes:

receiving the transmit signal sent by the sending apparatus, and performing frequency mixing on the transmit signal and a local-frequency signal, to generate a channel of quadrature branch analog signal and a channel of in-phase branch analog signal; and separately performing analog-to-digital conversion on the channel of quadrature branch analog signal and the channel of in-phase branch analog signal, to obtain the quadrature electrical signal and the in-phase electrical signal.

In a second possible implementation manner of the fourth aspect, the decoding the two channels of code bit signals in the N+1 channels of signals, to generate a channel of bit signal, and using the bit signal and other N−1 channels of signals as output signals specifically includes:

performing parallel-to-serial conversion on the two channels of code bit signals in the N+1 channels of signals, to generate the channel of bit signal, and using the channel of bit signal and the other N−1 channels of signals as the output signals.

In a third possible implementation manner of the fourth aspect, the decoding the two channels of code bit signals in the N+1 channels of signals, to generate a channel of bit signal, and using the bit signal and other N−1 channels of signals as output signals specifically includes:

delaying, by one clock cycle T, one channel of code bit signal that is not delayed in the two channels of code bit signals in the N+1 channels of signals, to obtain a channel of first code bit signal;

using the other channel of code bit signal of the two channels of first bit signals as the other channel of first code bit signal; and performing parallel-to-serial conversion on the two first channels of code bit signals, to generate the channel of bit signal, and using the bit signal and the other N−1 channels of signals as the output signals.

According to a fifth aspect, a sending device is provided, including:

a receiver, configured to receive N channels of bit signals by means of the communications unit; and a processor, configured to: perform serial-to-parallel conversion on any channel of bit signal of the N channels of bit signals, to generate two channels of first bit signals, where N is a natural number greater than 1; configured to: perform delay control on the two channels of first bit signals, to generate two channels of code bit signals, where the two channels of code bit signals differ by one clock cycle T; configured to: perform QAM quadrature amplitude modulation mapping on the two channels of code bit signals and other N−1 channels of bit signals, to generate a channel of quadrature electrical signal and a channel of in-phase electrical signal, where four quadrants of the in-phase electrical signal and the quadrature electrical signal are determined by bit values that correspond to the two channels of code bit signals at a same moment; and configured to: modulate the quadrature electrical signal and the in-phase electrical signal, to obtain a transmit signal.

According to a sixth aspect, a receiving device is provided, including:

a receiver, configured to receive, by means of the communications unit, a transmit signal sent by a sending device; and a processor, configured to: demodulate the transmit signal, to generate a channel of quadrature electrical signal and a channel of in-phase electrical signal; configured to: perform determining and QAM quadrature amplitude modulation demapping on the quadrature electrical signal and the in-phase electrical signal, to obtain N+1 channels of signals, where N is a natural number greater than 1, the N+1 channels of signals include two channels of code bit signals, and four quadrants of the in-phase electrical signal and the quadrature electrical signal are determined by bit values that correspond to the two channels of code bit signals at a same moment; and configured to: decode the two channels of code bit signals in the N+1 channels of signals, to generate a channel of bit signal, and use the bit signal and other N−1 channels of signals as output signals.

According to a seventh aspect, a signal transmission system is provided, where the signal transmission system includes a sending apparatus and a receiving apparatus, where the sending apparatus is the sending apparatus according to the first aspect, and the receiving apparatus is the receiving apparatus according to the second aspect, or the signal transmission system includes a sending device and a receiving device, where the sending device is the sending device according to the fifth aspect, and the receiving device is the receiving device according to the sixth aspect.

According to the code modulation and demodulation methods, the apparatuses, and the system provided in the embodiments of the present invention, a sending apparatus performs serial-to-parallel conversion on any channel of bit signal in received N channels of bit signals, to generate two channels of first bit signals, performs delay control on the two channels of first bit signals, to generate two channels of code bit signals that differ by one clock cycle T, then performs QAM quadrature amplitude modulation mapping on the two channels of code bit signals and other N−1 channels of bit signals, to generate a channel of quadrature electrical signal and a channel of in-phase electrical signal, and finally send, to a receiving apparatus, a transmit signal obtained by modulating the quadrature electrical signal and the in-phase electrical signal, so that the receiving apparatus demodulates the transmit signal, and restores the N channels of bit signals. Compared with the prior art, in the present invention, not only an envelope fluctuation degree of a signal is reduced, but also symbol reverse rates of a quadrature electrical signal and a in-phase electrical signal are reduced, so that the signal is closer to an constant envelope, thereby suppressing a nonlinear effect during link transmission, compressing a signal spectrum, improving a cycle skipping effect when a receive end performs phase retrieval on a received signal, and improving system performance.

BRIEF DESCRIPTION OF DRAWINGS

To describe the technical solutions in the embodiments of the present invention more clearly, the following briefly describes the accompanying drawings required for describing the embodiments or the prior art. Apparently, the accompanying drawings in the following description show merely some embodiments of the present invention, and persons of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are merely some but not all of the embodiments of the present invention. All other embodiments obtained by persons of ordinary skill in the art based on the embodiments of the present invention without creative efforts shall fall within the protection scope of the present invention.

Embodiment 1

Figure 1:
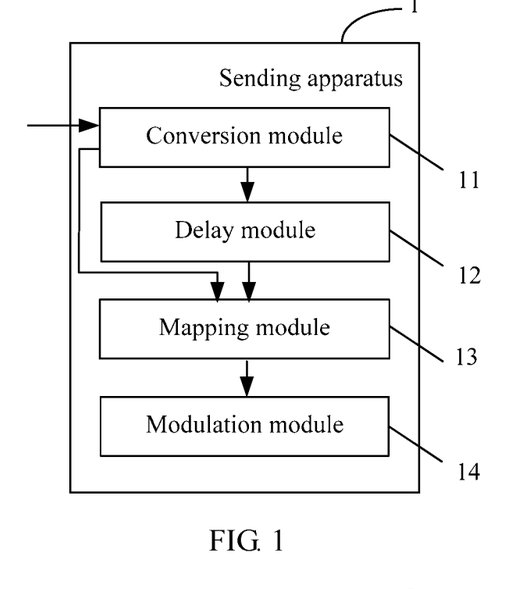
FIG. 1 is a schematic structural diagram of a sending apparatus according to an embodiment of the present invention.

This embodiment of the present invention provides a sending apparatus. As shown in FIG. 1, the sending apparatus 1 includes: a conversion module 11, a delay module 12, a mapping module 13, and a modulation module 14.

The conversion module 11 is configured to: receive N channels of bit signals, and perform serial-to-parallel conversion on any channel of bit signal of the N channels of bit signals, to generate two channels of first bit signals.

Exemplarily, a signal period of each bit signal in N (the parameter N is a natural number greater than 1) bit signals received by the sending apparatus is T, and a rate is 1/T. After the conversion module 11 of the sending apparatus performs serial-to-parallel conversion on any channel of bit signal of the N channels of bit signals, two channels of first bit signals whose periods are 2T and signaling rates are 1/(2T) and that keep synchronized are generated.

The delay module 12 is configured to: perform delay control on the two channels of first bit signals generated by the conversion module 11, to generate two channels of code bit signals, where the two channels of code bit signals differ by one clock cycle T.

Optionally, the delay module 12 is specifically configured to: delay either channel of first bit signal of the two channels of first bit signals by one clock cycle T, to generate a channel of code bit signal; and use the other first bit signal of the two channels of first bit signals as the other channel of code bit signal, so that the two channels of first bit signals differ by one clock cycle T. In this way, after the sending apparatus performs QAM mapping according to the two channels of code bit signals that differ by one clock cycle T, when a channel of in-phase electrical signal and a channel of quadrature electrical signal that are generated by the sending apparatus change at different moments, the in-phase electrical signal and the quadrature electrical signal change in only an adjacent quadrant, thereby reducing a change amplitude of a quadrant.

The mapping module 13 is configured to: perform QAM mapping according to the two channels of code bit signals generated by the delay module 12 and other N−1 channels of bit signals, to generate a channel of quadrature electrical signal and a channel of in-phase electrical signal.

Exemplarily, when the mapping module 13 performs QAM mapping on the two channels of code bit signals generated by the delay module 12 and the other N−1 channels of bit signals, the mapping module 13 may perform specific QAM mapping according to a specific QAM modulation scheme (for example, binary QAM (4QAM), quaternary QAM (16QAM), or octal QAM (64QAM)).

Specifically, four quadrants of the in-phase electrical signal and the quadrature electrical signal are determined by bit values that correspond to the two channels of code bit signals at a same moment. Constellation points in the four quadrants of the in-phase electrical signal and the quadrature electrical signal are determined by bit values that correspond to the other N−1 channels of bit signals at each moment.

The modulation module 14 is configured to: modulate the quadrature electrical signal and the in-phase electrical signal that are generated by the mapping module 13, to obtain a transmit signal.

The modulation module 14 may be an IQ modulator, or may be another device that can implement IQ modulation.

Exemplarily, in a 16QAM code modulation and demodulation process, when the sending apparatus receives three bit signals (a signal a, a signal b, and a signal c), the sending apparatus performs serial-to-parallel conversion on the signal a by using the conversion module 11, to generate two channels of first bit signals a1 and a2, performs delay control on the signal a1 and the signal a2 by using the delay module 12, so that the signal a1 and the signal a2 after delay control differ by one T, and then performs 16QAM mapping on the signal a1, the signal a2, the signal b, and the signal c by using the mapping module 13, to obtain a transmit signal. Specifically, referring to FIG. 6, when the signal a1 and the signal a2 are separately 00, 01, 10, and 11, corresponding quadrature electrical signals and corresponding channel of in-phase electrical signals after mapping are separately in the first, fourth, second, and third quadrants. It is determined, according to the signal b and the signal c, that the quadrature electrical signals and the in-phase electrical signals after mapping are separately in constellation points of the first, fourth, second, and third quadrants.

According to the sending apparatus provided in this embodiment of the present invention, the sending apparatus performs serial-to-parallel conversion on any channel of bit signal in received N channels of bit signals, to generate two channels of first bit signals, performs delay control on the two channels of first bit signals, to generate two channels of code bit signals that differ by one clock cycle T, then performs QAM quadrature amplitude modulation mapping on the two channels of code bit signals and other N−1 channels of bit signals, to generate a channel of quadrature electrical signal and a channel of in-phase electrical signal, and finally send, to a receiving apparatus, a transmit signal obtained by modulating the quadrature electrical signal and the in-phase electrical signal, so that the receiving apparatus demodulates the transmit signal, and restores the N channels of bit signals. Compared with the prior art, in the present invention, not only an envelope fluctuation degree of a signal is reduced, but also symbol reverse rates of a quadrature electrical signal and a in-phase electrical signal are reduced, so that the signal is closer to an constant envelope, thereby suppressing a nonlinear effect during link transmission, compressing a signal spectrum, improving a cycle skipping effect when a receive end performs phase retrieval on a received signal, and improving system performance.

In this embodiment of the present invention, unit division of the sending apparatus is an exemplary description, and actually, there may be multiple unit division methods to form the sending apparatus in this embodiment of the present invention.

Embodiment 2

Figure 2:
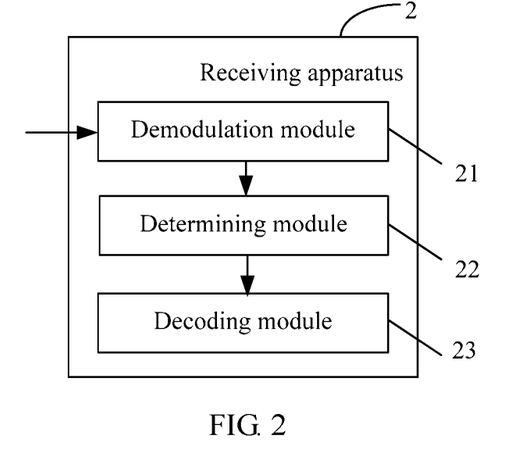
FIG. 2 is a schematic structural diagram of a receiving apparatus according to an embodiment of the present invention.

This embodiment of the present invention provides a receiving apparatus. As shown in FIG. 2, the receiving apparatus 2 includes: a demodulation module 21, a determining module 22, and a decoding module 23.

The demodulation module 21 is configured to: receive a transmit signal sent by a sending apparatus, and demodulate the transmit signal, to generate a channel of quadrature electrical signal and a channel of in-phase electrical signal.

The determining module 22 is configured to: perform determining and QAM demapping on the quadrature electrical signal and the in-phase electrical signal that are generated by the demodulation module 21, to obtain N+1 channels of signals.

The parameter N is a natural number greater than 1. After the determining module 22 performs determining on the quadrature electrical signal and the in-phase electrical signal that are generated by the demodulation module 21, when the determining module 22 performs QAM demapping, the determining module 22 may perform specific QAM demapping according to a specific QAM modulation scheme (for example, binary QAM (4QAM), quaternary QAM (16QAM), or octal QAM (64QAM)). It should be noted that, a QAM demodulation scheme used by the receiving apparatus needs to correspond to a QAM modulation scheme used by the sending apparatus. For example, if the sending apparatus uses 16-QAM modulation, the receiving apparatus needs to use a 16-QAM demodulation scheme to demodulate a signal.

Exemplarily, the N+1 channels of signals include two channels of code bit signals, and four quadrants of the in-phase electrical signal and the quadrature electrical signal are determined by bit values that correspond to the two channels of code bit signals at a same moment, so that the determining module 22 may determine, according to constellation points in the four quadrants of the in-phase electrical signal and the quadrature electrical signal, the bit values that correspond to the two channels of code bit signals at the same moment, and then determine the two channels of code bit signals.

The decoding module 23 is configured to: decode the two channels of code bit signals in the N+1 channels of signals obtained by the determining module 22, to generate a channel of bit signal, and use the channel of bit signal and other N−1 channels of signals as output signals.

According to the receiving apparatus provided in this embodiment of the present invention, after receiving a transmit signal sent by the sending apparatus, the receiving apparatus demodulates the transmit signal, to generate a channel of quadrature electrical signal and a channel of in-phase electrical signal, performs determining and demapping on the quadrature electrical signal and the in-phase electrical signal, to obtain N+1 channels of signals, then decodes two channels of code bit signals in the N+1 channels of signals, to generate a channel of bit signal, and finally uses the channel of bit signal and other N−1 channels of signals as output signals. Compared with the prior art, in the present invention, not only an envelope fluctuation degree of a signal is reduced, but also symbol reverse rates of a quadrature electrical signal and a in-phase electrical signal are reduced, so that the signal is closer to an constant envelope, thereby suppressing a nonlinear effect during link transmission, compressing a signal spectrum, improving a cycle skipping effect when a receive end performs phase retrieval on a received signal, and improving system performance.

Optionally, the demodulation module 21 is specifically configured to: receive the transmit signal sent by the sending apparatus, and perform frequency mixing on the transmit signal and a local-frequency signal, to generate a channel of quadrature analog signal and a channel of in-phase analog signal; and separately perform analog-to-digital conversion on the channel of quadrature analog signal and the channel of in-phase analog signal, to obtain the quadrature electrical signal and the in-phase electrical signal.

Exemplarily, after receiving the transmit signal sent by the sending apparatus, the demodulation module 21 perform frequency mixing on the transmit signal and the local-frequency signal generated by an oscillator, to generate the channel of quadrature analog signal and the channel of in-phase analog signal, and separately perform analog-to-digital conversion on the channel of quadrature analog signal and the channel of in-phase analog signal, to generate the quadrature electrical signal and the in-phase electrical signal.

Optionally, the decoding module 23 is specifically configured to: perform parallel-to-serial conversion on the two channels of code bit signals in the N+1 channels of signals obtained by the determining module, to generate the channel of bit signal, and use the channel of bit signal and the other N−1 channels of signals as the output signals.

Figure 3:
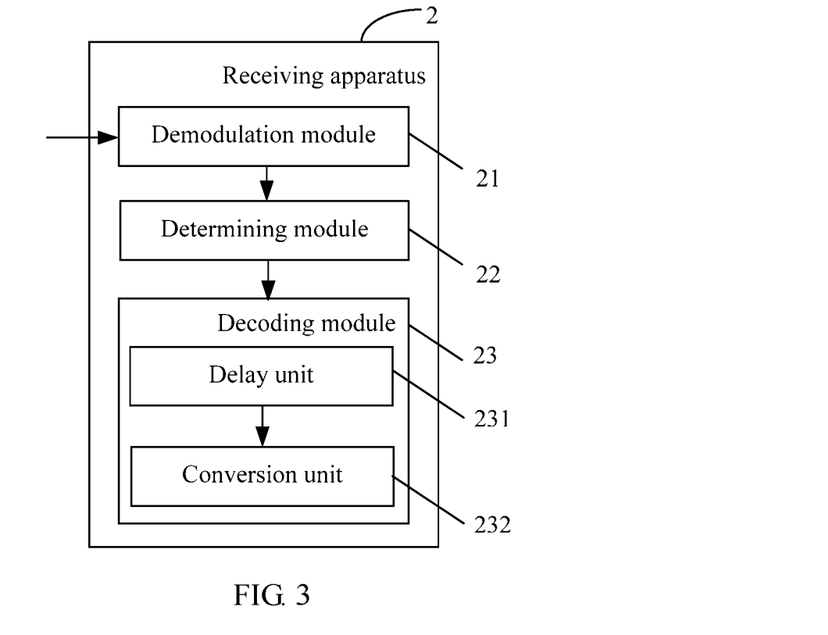
FIG. 3 is a schematic structural diagram of another receiving apparatus according to an embodiment of the present invention.

Optionally, as shown in FIG. 3, the decoding module 23 includes: a delay unit 231 and a conversion unit 232.

The delay unit 231 is configured to: delay, by one clock cycle T, a channel of code bit signal that is not delayed in the two channels of code bit signals in the N+1 channels of signals obtained by the determining module 22, to obtain a channel of first code bit signal, and use the other channel of code bit signal of the two channels of code bit signals as the other channel of first code bit signal, to keep the two first channels of code bit signals synchronized, so that the conversion unit 232 performs conversion on the two synchronized first channels of code bit signals.

The conversion unit 232 is configured to: perform parallel-to-serial conversion on the two first channels of code bit signals, to generate the channel of bit signal, and use the channel of bit signal and the other N−1 channels of signals as the output signals.

According to the receiving apparatus provided in this embodiment of the present invention, after receiving a transmit signal sent by the sending apparatus, the receiving apparatus demodulates the transmit signal, to generate a channel of quadrature electrical signal and a channel of in-phase electrical signal, performs determining and demapping on the quadrature electrical signal and the in-phase electrical signal, to obtain N+1 channels of signals, then decodes two channels of code bit signals in the N+1 channels of signals, to generate a channel of bit signal, and finally uses the channel of bit signal and other N−1 channels of signals as output signals. Compared with the prior art, in the present invention, not only an envelope fluctuation degree of a signal is reduced, but also symbol reverse rates of a quadrature electrical signal and a in-phase electrical signal are reduced, so that the signal is closer to an constant envelope, thereby suppressing a nonlinear effect during link transmission, compressing a signal spectrum, improving a cycle skipping effect when a receive end performs phase retrieval on a received signal, and improving system performance.

In this embodiment of the present invention, unit division of the receiving apparatus is an exemplary description, and actually, there may be multiple unit division methods to form the receiving apparatus in this embodiment of the present invention.

Embodiment 3

Figure 4:
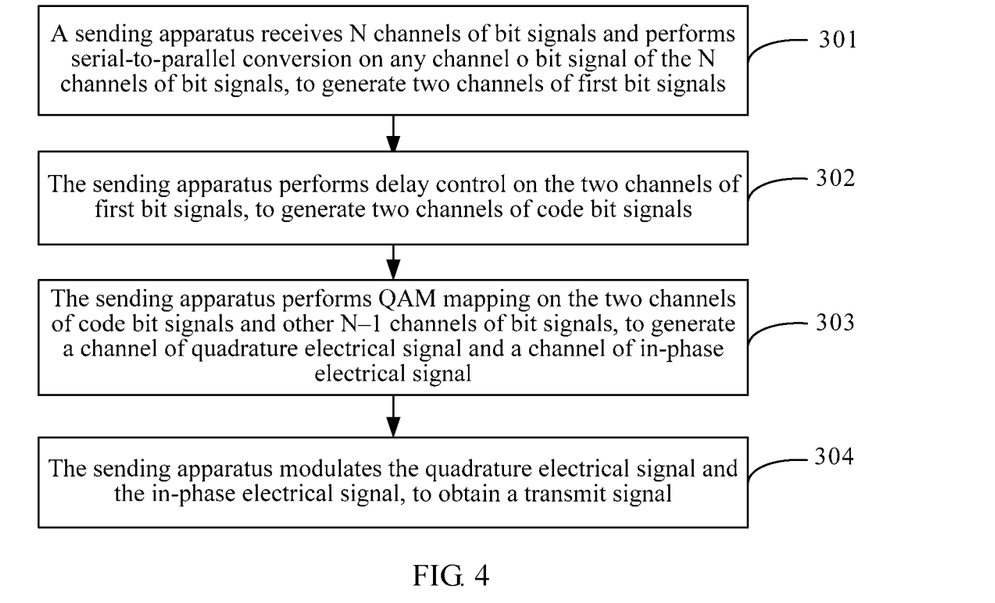
FIG. 4 is a schematic flowchart of a code modulation method according to an embodiment of the present invention.

This embodiment of the present invention provides a code modulation method, as shown in FIG. 4, which may implemented by a sending apparatus. The code modulation method specifically includes the following steps:

301: A sending apparatus receives N channels of bit signals and performs serial-to-parallel conversion on any channel of bit signal of the N channels of bit signals, to generate two channels of first bit signals.

Exemplarily, a signal period of each bit signal in N (the parameter N is a natural number greater than 1) bit signals received by the sending apparatus is T, and a rate is 1/T. After serial-to-parallel conversion is performed on any channel of bit signal of the N channels of bit signals, two channels of first bit signals whose periods are 2T and signaling rates are 1/(2T) and that keep synchronized are generated.

302: The sending apparatus performs delay control on the two channels of first bit signals, to generate two channels of code bit signals.

Optionally, step 302 specifically includes the following steps:

302a: The sending apparatus delays either channel of first bit signal of the two channels of first bit signals by one clock cycle T, to generate a channel of code bit signal.

302b: The sending apparatus uses the other first bit signal of the two channels of first bit signals as the other channel of code bit signal.

Exemplarily, when performing delay control on the two channels of first bit signals, the sending apparatus may choose to delay either channel of first bit signal of the two channels of first bit signals by one clock cycle T, to generate the code bit signal, and then directly uses the other first bit signal of the two channels of first bit signals as the other channel of code bit signal to output, so that the two channels of first bit signals differ by one clock cycle T. In this way, after the sending apparatus performs QAM mapping according to the two channels of code bit signals that differ by one clock cycle T, when a channel of in-phase electrical signal and a channel of quadrature electrical signal that are generated by the sending apparatus change at different moments, the in-phase electrical signal and the quadrature electrical signal change in only an adjacent quadrant, thereby reducing a change amplitude of a quadrant.

303: The sending apparatus performs QAM mapping on the two channels of code bit signals and other N−1 channels of bit signals, to generate a channel of quadrature electrical signal and a channel of in-phase electrical signal.

Specifically, four quadrants of the in-phase electrical signal and the quadrature electrical signal are determined by bit values that correspond to the two channels of code bit signals at a same moment. Constellation points in the four quadrants of the in-phase electrical signal and the quadrature electrical signal are determined by bit values that correspond to the other N−1 channels of bit signals at each moment. Exemplarily, when the sending apparatus performs QAM mapping on the two channels of code bit signals and the other N−1 channels of bit signals, the sending apparatus may perform specific QAM mapping according to a specific QAM modulation scheme (for example, binary QAM (4QAM), quaternary QAM (16QAM), or octal QAM (64QAM)).

304: The sending apparatus performs modulation on the quadrature electrical signal and the in-phase electrical signal, to obtain a transmit signal.

It should be noted that, because the four quadrants of the in-phase electrical signal and the quadrature electrical signal are determined according to the two channels of first bit signals, and the two channels of first bit signals are two synchronized signals obtained by the sending apparatus by performing serial-to-parallel conversion on any channel of bit signal of the N channels of bit signals, when the sending apparatus determines the four quadrants of the in-phase electrical signal and the quadrature electrical signal according to the two synchronized channels of first bit signals, symbol reverse rates of the quadrature electrical signal and the in-phase electrical signal can be reduced, so that a signal is closer to a constant envelope, thereby suppressing a nonlinear effect during link transmission, compressing a signal spectrum, and improving system performance.

According to the code modulation method provided in this embodiment of the present invention, a sending apparatus performs serial-to-parallel conversion on any channel of bit signal in received N channels of bit signals, to generate two channels of first bit signals, performs delay control on the two channels of first bit signals, to generate two channels of code bit signals that differ by one clock cycle T, then performs QAM quadrature amplitude modulation mapping on the two channels of code bit signals and other N−1 channels of bit signals, to generate a channel of quadrature electrical signal and a channel of in-phase electrical signal, and finally send, to a receiving apparatus, a transmit signal obtained by modulating the quadrature electrical signal and the in-phase electrical signal, so that the receiving apparatus demodulates the transmit signal, and restores the N channels of bit signals. Compared with the prior art, in the present invention, not only an envelope fluctuation degree of a signal is reduced, but also symbol reverse rates of a quadrature electrical signal and a in-phase electrical signal are reduced, so that the signal is closer to an constant envelope, thereby suppressing a nonlinear effect during link transmission, compressing a signal spectrum, improving a cycle skipping effect when a receive end performs phase retrieval on a received signal, and improving system performance.

Embodiment 4

Figure 5:
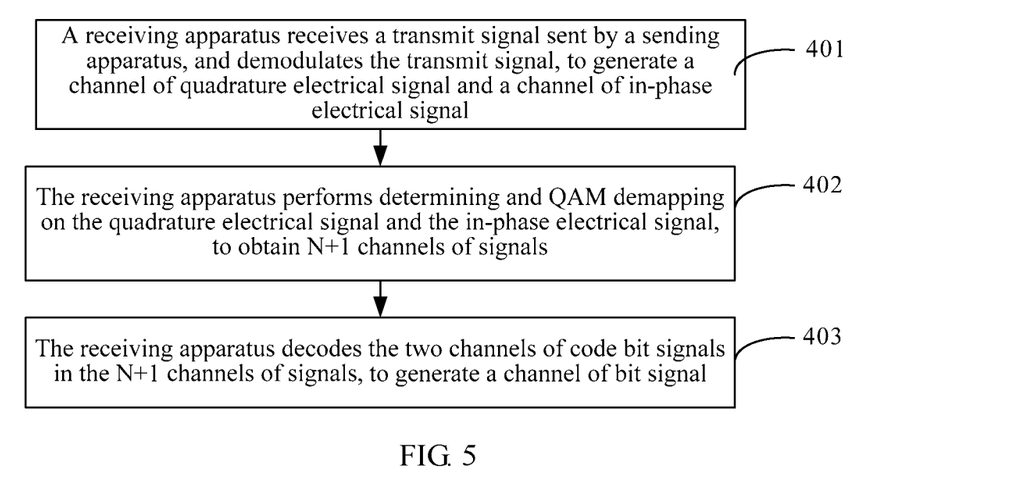
FIG. 5 is a schematic flowchart of a code demodulation method according to an embodiment of the present invention.

This embodiment of the present invention provides a code demodulation method, as shown in FIG. 5, which may implemented by a receiving apparatus. The code demodulation method specifically includes the following steps:

401: A receiving apparatus receives a transmit signal sent by a sending apparatus, and demodulates the transmit signal, to generate a channel of quadrature electrical signal and a channel of in-phase electrical signal.

Optionally, step 401 specifically includes the following steps:

401a: The receiving apparatus receives the transmit signal sent by the sending apparatus, and performs frequency mixing on the transmit signal and a local-frequency signal, to generate a channel of quadrature branch analog signal and a channel of in-phase branch analog signal.

401b: The receiving apparatus separately performs analog-to-digital conversion on the channel of quadrature branch analog signal and the channel of in-phase branch analog signal, to obtain a channel of quadrature electrical signal and a channel of in-phase electrical signal.

Exemplarily, after receiving the transmit signal sent by the sending apparatus, the receiving apparatus needs to demodulate the transmit signal. When demodulating the transmit signal, the receiving apparatus may perform frequency mixing on the transmit signal and the local-frequency signal generated by an oscillator, to generate the channel of quadrature analog signal and the channel of in-phase analog signal, and then separately performs analog-to-digital conversion on the channel of quadrature analog signal and the channel of in-phase analog signal, to generate the quadrature electrical signal and the in-phase electrical signal.

402: The receiving apparatus performs determining and QAM demapping on the quadrature electrical signal and the in-phase electrical signal, to obtain N+1 channels of signals.

Exemplarily, after receiving the quadrature electrical signal and the in-phase electrical signal, the receiving apparatus performs equalization and synchronization on the quadrature electrical signal and the in-phase electrical signal, to obtain a processed channel of quadrature electrical signal and a processed channel of in-phase electrical signal, and then performs determining and demapping on the processed channel of quadrature electrical signal and the processed channel of in-phase electrical signal, to obtain the N+1 channels of signals, where the parameter N is a natural number greater than 1.

It should be noted that, after the receiving apparatus performs determining on the quadrature electrical signal and the in-phase electrical signal, when the receiving apparatus performs QAM demapping, the receiving apparatus may perform specific QAM demapping according to a specific QAM modulation scheme (for example, binary QAM (4QAM), quaternary QAM (16QAM), or octal QAM (64QAM)). It should be noted that, a QAM demodulation scheme used by the receiving apparatus needs to correspond to a QAM modulation scheme used by the sending apparatus. For example, if the sending apparatus uses 16-QAM modulation, the receiving apparatus needs to use a 16-QAM demodulation scheme to demodulate a signal.

Exemplarily, the N+1 channels of signals include two channels of code bit signals, and four quadrants of the in-phase electrical signal and the quadrature electrical signal are determined by bit values that correspond to the two channels of code bit signals at a same moment, so that the receiving apparatus may determine, according to constellation points in the four quadrants of the in-phase electrical signal and the quadrature electrical signal, the bit values that correspond to the two channels of code bit signals at the same moment, and then determine the two channels of code bit signals.

403: The receiving apparatus decodes the two channels of code bit signals in the N+1 channels of signals, to generate a channel of bit signal, and uses the channel of bit signal and other N−1 channels of signals as output signals.

The N+1 channels of signals include the two channels of code bit signals and N−1 channels of bit signals. Exemplarily, when the receiving apparatus decodes the two channels of code bit signals in the N+1 channels of signals in step 402, two implementation manners may be specifically used for implementation.

In a first implementation manner, optionally, step 403 specifically includes the following content:

403*a*: The receiving apparatus performs parallel-to-serial conversion on the two channels of code bit signals in the N+1 channels of signals, to generate the channel of bit signal, and uses the channel of bit signal and the other N−1 channels of signals as the output signals.

In a second implementation manner, optionally, step 403 specifically includes the following steps:

403*b*1: The receiving apparatus delays, by one clock cycle T, a channel of code bit signal that is not delayed in the two channels of code bit signals in the N+1 channels of signals, to obtain a channel of first code bit signal, and uses the other channel of code bit signal of the two channels of code bit signals as the other channel of first code bit signal.

403*b*2: The receiving apparatus performs parallel-to-serial conversion on the two first channels of code bit signals, to generate the channel of bit signal, and uses the channel of bit signal and the other N−1 channels of signals as the output signals.

Exemplarily, when decoding the two channels of code bit signals, the receiving apparatus may directly decode the two channels of code bit signals in a parallel-to-serial conversion manner, or may delay, by one clock cycle T, the code bit signal that is not delayed in the two channels of code bit signals, to align the code bit signal with the other channel of code bit signal, and then performs serial-to-parallel conversion on the two channels of code bit signals for decoding.

According to the code demodulation method provided in this embodiment of the present invention, after receiving a transmit signal sent by the sending apparatus, a receiving apparatus demodulates the transmit signal, to generate a channel of quadrature electrical signal and a channel of in-phase electrical signal, performs determining and demapping on the quadrature electrical signal and the in-phase electrical signal, to obtain N+1 channels of signals, then decodes two channels of code bit signals in the N+1 channels of signals, to generate a channel of bit signal, and finally uses the channel of bit signal and other N−1 channels of signals as output signals. Compared with the prior art, in the present invention, not only an envelope fluctuation degree of a signal is reduced, but also symbol reverse rates of a quadrature electrical signal and a in-phase electrical signal are reduced, so that the signal is closer to an constant envelope, thereby suppressing a nonlinear effect during link transmission, compressing a signal spectrum, improving a cycle skipping effect when a receive end performs phase retrieval on a received signal, and improving system performance.

Embodiment 5

The code modulation and demodulation methods provided in the embodiments of the present invention are exemplarily described below in specific scenarios. For descriptions of technical terms, concepts, and the like that are related to the foregoing embodiments in the following embodiment, reference may be made to the foregoing embodiments. The following embodiment is mainly specific to 16QAM code modulation and demodulation processes.

Specifically, a process in which a sending apparatus performs 16-QAM code modulation on three (that is, a parameter N is 3) received bit signals is as follows:

First, the sending apparatus receives three bit signals, where signal periods of the three bit signals (a signal a, a signal b, and a signal c) are T, and rates of the signals are 1/T. Next, the sending apparatus performs serial-to-parallel conversion on the signal a in the three bit signals, to generate two synchronized channels of first bit signals (a1 and a2), and performs delay control on the signal a1 and the signal a2, so that the signal a1 and the signal a2 differ by one clock cycle T in terms of time, where signal periods of the signal a1 and the signal a2 before delay is performed are 2T, and rates of the signals are 1/(2T), and the signal a1 and the signal a2 after delay control differ by one T. Then, the sending apparatus performs 16-QAM mapping on the signal a1 and the signal a2 after delay control with the signal b and the signal c together according to a 16-QAM modulation scheme, to obtain a channel of quadrature electrical signal and a channel of in-phase electrical signal. Finally, the sending apparatus modulates the quadrature electrical signal and the in-phase electrical signal, to obtain a transmit signal that needs to be sent to a receiving apparatus.

When the sending apparatus performs 16-QAM mapping on the signal a1 and the signal a2 with the signal b and the signal c together according to a mapping manner corresponding to the 16-QAM modulation scheme, the sending apparatus may determine quadrants of the quadrature electrical signal and the in-phase electrical signal after mapping according to the signal a1 and the signal a2, and determines constellation points in the quadrant of the quadrature electrical signal and the in-phase electrical signal after mapping according to the signal b and the signal c. Specifically, it may be learned by referring to a diagram of 16-QAM mapping shown in FIG. 6 that when the signal a1 and the signal a2 are separately 00, 01, 10, and 11, the corresponding channel of quadrature electrical signal and the corresponding channel of in-phase electrical signal after mapping are separately in the first, fourth, second, and third quadrants. Referring to a 16-QAM mapping table shown in Table 1, exemplarily, when the signal a1 and the signal a2 are 00, the corresponding channel of quadrature electrical signal and the corresponding channel of in-phase electrical signal after mapping are in the first quadrant, and the constellation points in the first quadrant of the quadrature electrical signal and the in-phase electrical signal after mapping are (3,3), (1,3), (3,1), and (1,1).

TABLE 1

| a1a2bc | I | Q |
| --- | --- | --- |
| 1111 | −3 | −3 |
| 1110 | −1 | −3 |
| 1101 | −3 | −1 |
| 1100 | −1 | −1 |
| 1011 | 1 | 3 |
| 1010 | 1 | 3 |
| 1001 | 1 | 3 |
| 1000 | 1 | 3 |
| 0111 | 3 | −3 |
| 0110 | 3 | −1 |
| 0101 | 1 | −3 |
| 0100 | −1 | −1 |
| 0011 | 3 | 3 |
| 0010 | 1 | 3 |
| 0001 | 3 | 1 |
| 0000 | 1 | 1 |

Specifically, a processing in which the receiving apparatus performs 16-QAM code demodulation on a received transmit signal is as follows:

First, after receiving the transmit signal sent by the sending apparatus, the receiving apparatus performs frequency mixing on the transmit signal and a local-frequency signal, to obtain a channel of quadrature branch analog signal and a channel of in-phase branch analog signal. Next, the receiving apparatus performs analog-to-digital conversion on the channel of quadrature branch analog signal and the channel of in-phase branch analog signal, to obtain a quadrature branch digital signal and an in-phase branch digital signal, and performs equalization and synchronization on the quadrature branch digital signal and the in-phase branch digital signal, to obtain a processed channel of quadrature electrical signal and a processed channel of in-phase electrical signal. Then, the receiving apparatus performs determining and demapping on the quadrature electrical signal and the in-phase electrical signal after equalization according to the diagram of 16-QAM mapping shown in FIG. 6 and the 16-QAM mapping table shown in Table 1 that are used by the receiving apparatus, to obtain four signals (the signal a1, the signal a2, the signal b, and the signal c), and decodes the signal a1 and the signal a2, to obtain a signal a. Finally, the sending apparatus uses the signal a, the signal b, and the signal c as output signals.

Figure 7:
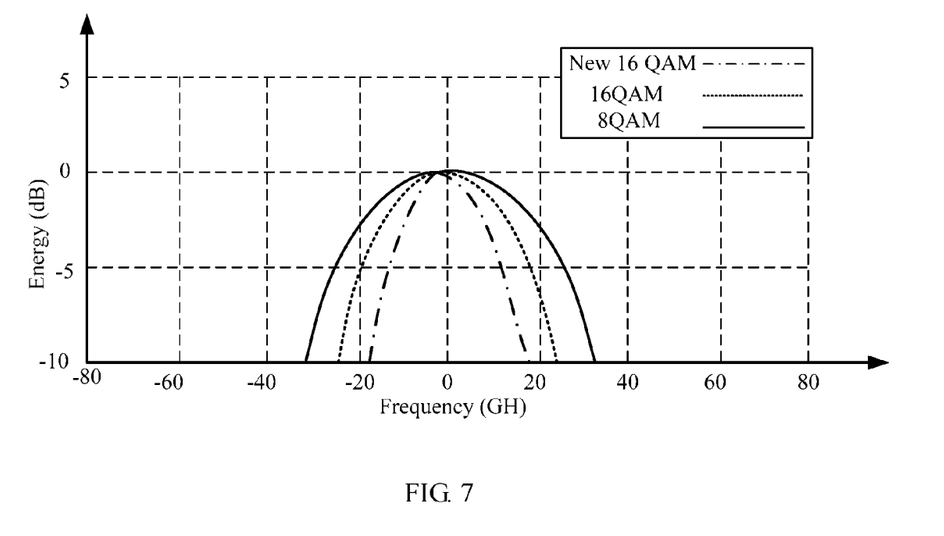
FIG. 7 is a diagram of spectrum comparison between three solutions implementing 128 Gb/s transmission according to an embodiment of the present invention.

In addition, it may be learned by referring to spectrum charts in three solutions implementing 128 Gb/s transmission shown in FIG. 7 that when signal energy is −10 db (Decibel, decibel), in the present invention, a signal frequency required to implement 16QAM modulation and demodulation is 18 GH (gigahertz), and correspondingly, in the prior art, a signal frequency required to implement 16QAM modulation and demodulation is 25 GH, and a signal frequency required to implement 8QAM modulation and demodulation is 32 GH. It may be obviously seen that, the signal frequency required to implement 16QAM modulation and demodulation in the present invention is less than the signal frequency required to implement 16QAM and 8QAM modulation and demodulation in the prior art. Therefore, it may be seen that the code modulation and demodulation methods provided in the present invention can compress a signal spectrum, thereby effectively lowering a requirement of a system on a component bandwidth, and improving system performance.

It should be noted that, 16-QAM code modulation and demodulation processes based on a 16-QAM coding rule are only an example in this embodiment, and the code modulation and demodulation processes may be further performed in the present invention according to a QAM coding rule (for example, a 4-QAM coding rule, a 32-QAM coding rule, or a 64-QAM coding rule) corresponding to another coding scheme, which is not limited herein.

According to the code modulation method provided in this embodiment of the present invention, a sending apparatus performs serial-to-parallel conversion on any channel of bit signal in received N channels of bit signals, to generate two channels of first bit signals, performs delay control on the two channels of first bit signals, to generate two channels of code bit signals that differ by one clock cycle T, then performs QAM quadrature amplitude modulation mapping on the two channels of code bit signals and other N−1 channels of bit signals, to generate a channel of quadrature electrical signal and a channel of in-phase electrical signal, and finally send, to a receiving apparatus, a transmit signal obtained by modulating the quadrature electrical signal and the in-phase electrical signal, so that the receiving apparatus demodulates the transmit signal, and restores the N channels of bit signals. Compared with the prior art, in the present invention, not only an envelope fluctuation degree of a signal is reduced, but also symbol reverse rates of a quadrature electrical signal and a in-phase electrical signal are reduced, so that the signal is closer to an constant envelope, thereby suppressing a nonlinear effect during link transmission, compressing a signal spectrum, improving a cycle skipping effect when a receive end performs phase retrieval on a received signal, and improving system performance.

Embodiment 6

This embodiment of the present invention provides a sending device. For the specific operating principle of the sending device, interaction with another receiving device, and related content such as technical terms and concepts, reference may be made to the sending apparatus shown in the embodiment in FIG. 1, which are not described in detail herein again.

Figure 8:
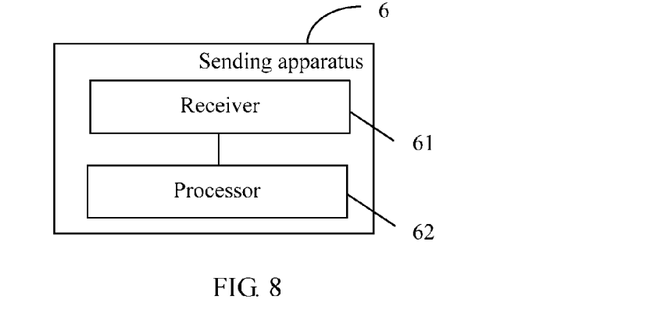
FIG. 8 is a schematic structural diagram of a sending device according to another embodiment of the present invention.

Exemplarily, as shown in FIG. 8, the sending device 6 includes a receiver 61 and a processor 62.

The receiver 61 is configured to receive N channels of bit signals.

The processor 62 is configured to: perform serial-to-parallel conversion on any channel of bit signal of the N channels of bit signals, to generate two channels of first bit signals, where N is a natural number greater than 1; configured to: perform delay control on the two channels of first bit signals, to generate two channels of code bit signals, where the two channels of code bit signals differ by one clock cycle T; configured to: perform QAM mapping on the two channels of code bit signals and other N−1 channels of bit signals, to generate a channel of quadrature electrical signal and a channel of in-phase electrical signal, where four quadrants of the in-phase electrical signal and the quadrature electrical signal are determined by bit values that correspond to the two channels of code bit signals at a same moment; and configured to: modulate the quadrature electrical signal and the in-phase electrical signal, to obtain a transmit signal.

Optionally, the performing, by the processor 62, delay control on the two channels of first bit signals, to generate two channels of code bit signals specifically includes: delaying either channel of first bit signal of the two channels of first bit signals by one clock cycle T, to generate a channel of code bit signal, and using the other first bit signal of the two channels of first bit signals as the other channel of code bit signal.

According to the sending device provided in this embodiment of the present invention, the sending device performs serial-to-parallel conversion on any channel of bit signal in received N channels of bit signals, to generate two channels of first bit signals, performs delay control on the two channels of first bit signals, to generate two channels of code bit signals that differ by one clock cycle T, then performs QAM quadrature amplitude modulation mapping on the two channels of code bit signals and other N−1 channels of bit signals, to generate a channel of quadrature electrical signal and a channel of in-phase electrical signal, and finally send, to a receiving device, a transmit signal obtained by modulating the quadrature electrical signal and the in-phase electrical signal, so that the receiving device demodulates the transmit signal, and restores the N channels of bit signals. Compared with the prior art, in the present invention, not only an envelope fluctuation degree of a signal is reduced, but also symbol reverse rates of a quadrature electrical signal and a in-phase electrical signal are reduced, so that the signal is closer to an constant envelope, thereby suppressing a nonlinear effect during link transmission, compressing a signal spectrum, improving a cycle skipping effect when a receive end performs phase retrieval on a received signal, and improving system performance.

In this embodiment of the present invention, unit division of the sending device is an exemplary description, and actually, there may be multiple unit division methods to form the sending device in this embodiment of the present invention.

Embodiment 7

An embodiment of the present invention provides a receiving device. For the specific operating principle of the receiving device, interaction with another receiving device, and related content such as technical terms and concepts, reference may be made to the receiving apparatus shown in the embodiments in FIG. 2 and FIG. 3, which are not described in detail herein again.

Figure 9:
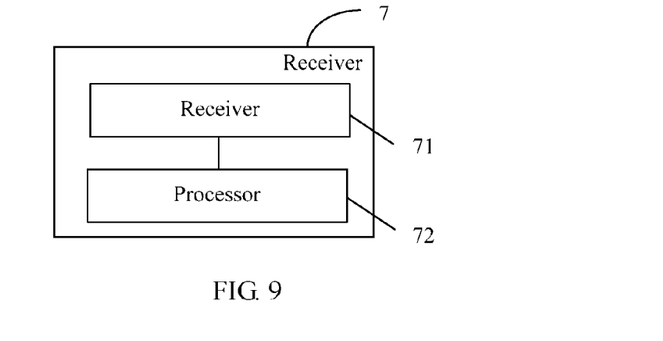
FIG. 9 is a schematic structural diagram of a receiving device according to another embodiment of the present invention.

Exemplarily, as shown in FIG. 9, the sending device 7 includes a receiver 71 and a processor 72.

The receiver 71 is configured to receive a transmit signal sent by a sending device.

The processor 72 is configured to: demodulate the transmit signal, to generate a channel of quadrature electrical signal and a channel of in-phase electrical signal; configured to: perform determining and demapping on the quadrature electrical signal and the in-phase electrical signal, to obtain N+1 channels of signals, where the parameter N is a natural number greater than 1; and configured to: decode two channels of code bit signals in the N+1 channels of signals, to generate a channel of bit signal, and use the channel of bit signal and other N−1 channels of signals as output signals.

Optionally, after the receiver 71 receives the transmit signal sent by the sending device, the performing, by the processor 72, demodulation on the transmit signal, to generate a channel of quadrature electrical signal and a channel of in-phase electrical signal specifically includes: performing frequency mixing on the signal transmit signal and a local-frequency signal, to generate a channel of quadrature branch analog signal and a channel of in-phase branch analog signal, and separately performing analog-to-digital conversion on the channel of quadrature branch analog signal and the channel of in-phase branch analog signal, to obtain the quadrature electrical signal and the in-phase electrical signal.

Optionally, the performing, by the processor 71, decoding on two channels of code bit signals in the N+1 channels of signals, to generate a channel of bit signal specifically includes: performing parallel-to-serial conversion on the two channels of code bit signals in the N+1 channels of signals, to generate the channel of bit signal, and using the channel of bit signal and the other N−1 channels of signals as the output signals.

Optionally, the decoding, by the processor 71, two channels of code bit signals in the N+1 channels of signals, to generate a channel of bit signal specifically includes: delaying, by one clock cycle T, a channel of code bit signal that is not delayed in the two channels of code bit signals in the N+1 channels of signals, to obtain a channel of first code bit signal; using the other channel of code bit signal of the two channels of code bit signals as the other channel of first code bit signal; and performing parallel-to-serial conversion on the two first channels of code bit signals, to generate the channel of bit signal, and using the channel of bit signal and the other N−1 channels of signals as the output signals.

According to the receiving device provided in this embodiment of the present invention, after receiving a transmit signal sent by the sending device, the receiving device demodulates the transmit signal, to generate a channel of quadrature electrical signal and a channel of in-phase electrical signal, performs determining and demapping on the quadrature electrical signal and the in-phase electrical signal according to a QAM modulation mapping rule of a transmit end, to obtain N+1 channels of signals, then decodes two channels of code bit signals in the N+1 channels of signals, to generate a channel of bit signal, and finally uses the channel of bit signal and other N−1 channels of signals as output signals. Compared with the prior art, in the present invention, not only an envelope fluctuation degree of a signal is reduced, but also symbol reverse rates of a quadrature electrical signal and a in-phase electrical signal are reduced, so that the signal is closer to an constant envelope, thereby suppressing a nonlinear effect during link transmission, compressing a signal spectrum, improving a cycle skipping effect when a receive end performs phase retrieval on a received signal, and improving system performance.

In this embodiment of the present invention, unit division of the receiving device is an exemplary description, and actually, there may be multiple unit division methods to form the receiving device of this embodiment of the present invention.

Embodiment 8

Figure 6:
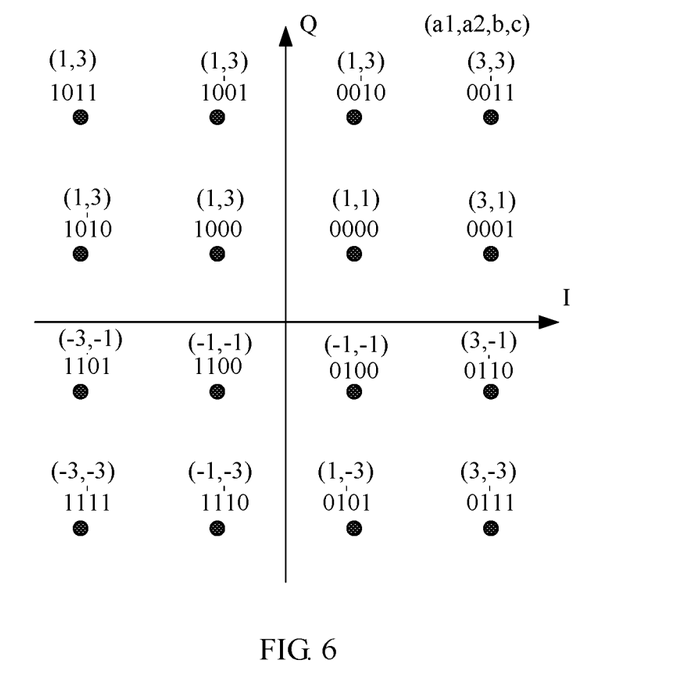
FIG. 6 is a diagram of 16-QAM mapping according to an embodiment of the present invention.
Figure 10:
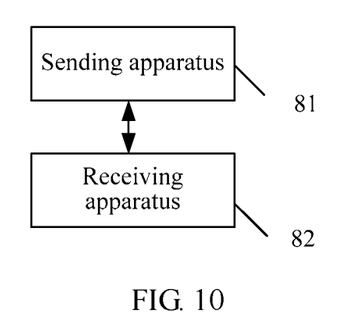
FIG. 10 is a system structural diagram of a code demodulation and demodulation system according to an embodiment of the present invention.

The sending apparatus and the receiving apparatus provided in the embodiments of the present invention may further form a signal transmission system, to implement the code modulation and demodulation methods provided in the embodiments shown in FIG. 4 to FIG. 6. Exemplarily, as shown in FIG. 10, the signal transmission system 8 includes: a sending apparatus 81 and a receiving apparatus 82. The sending apparatus 81 may be the sending apparatus shown in FIG. 1, and the receiving apparatus 82 may be the receiving apparatus shown in FIG. 2 and FIG. 3.

According to the sending device provided in this embodiment of the present invention, the sending device performs serial-to-parallel conversion on any channel of bit signal in received N channels of bit signals, to generate two channels of first bit signals, performs delay control on the two channels of first bit signals, to generate two channels of code bit signals that differ by one clock cycle T, then performs QAM quadrature amplitude modulation mapping on the two channels of code bit signals and other N−1 channels of bit signals, to generate a channel of quadrature electrical signal and a channel of in-phase electrical signal, and finally send, to a receiving device, a transmit signal obtained by modulating the quadrature electrical signal and the in-phase electrical signal, so that the receiving device demodulates the transmit signal, and restores the N channels of bit signals. Compared with the prior art, in the present invention, not only an envelope fluctuation degree of a signal is reduced, but also symbol reverse rates of a quadrature electrical signal and a in-phase electrical signal are reduced, so that the signal is closer to an constant envelope, thereby suppressing a nonlinear effect during link transmission, compressing a signal spectrum, improving a cycle skipping effect when a receive end performs phase retrieval on a received signal, and improving system performance.

Embodiment 9

Figure 11:
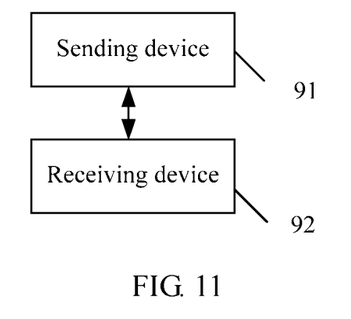
FIG. 11 is a system structural diagram of another code demodulation and demodulation system according to an embodiment of the present invention.

The sending device and the receiving device provided in the embodiments of the present invention may further form a signal transmission system, to implement the code modulation and demodulation methods provided in the embodiments shown in FIG. 4 to FIG. 6. Exemplarily, as shown in FIG. 11, the signal transmission system 9 includes: a sending device 91 and a receiving device 92. The sending device 91 may be the sending device shown in FIG. 7, and the receiving device 92 may be the receiving device shown in FIG. 8.

According to the sending device provided in this embodiment of the present invention, the sending device performs serial-to-parallel conversion on any channel of bit signal in received N channels of bit signals, to generate two channels of first bit signals, performs delay control on the two channels of first bit signals, to generate two channels of code bit signals that differ by one clock cycle T, then performs QAM quadrature amplitude modulation mapping on the two channels of code bit signals and other N−1 channels of bit signals, to generate a channel of quadrature electrical signal and a channel of in-phase electrical signal, and finally send, to a receiving device, a transmit signal obtained by modulating the quadrature electrical signal and the in-phase electrical signal, so that the receiving device demodulates the transmit signal, and restores the N channels of bit signals. Compared with the prior art, in the present invention, not only an envelope fluctuation degree of a signal is reduced, but also symbol reverse rates of a quadrature electrical signal and a in-phase electrical signal are reduced, so that the signal is closer to an constant envelope, thereby suppressing a nonlinear effect during link transmission, compressing a signal spectrum, improving a cycle skipping effect when a receive end performs phase retrieval on a received signal, and improving system performance.

It may be clearly understood by persons skilled in the art that, for the purpose of convenient and brief description, division of the foregoing functional modules is taken as an example for illustration. In actual application, the foregoing functions can be allocated to different functional modules and implemented according to a requirement, that is, an inner structure of an apparatus is divided into different functional modules to implement all or some of the functions described above. For a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely exemplary. For example, the module or unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to the prior art, or all or some of the technical solutions may be implemented in the form of a software product. The computer software product is stored in a storage medium and includes several instructions for instructing a computer device (which may be a personal computer, a server, a network device, or the like) or a processor (processor) to perform all or some of the steps of the methods described in the embodiments of this application. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

The foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of this application.

What is claimed is:

1. A sending apparatus, comprising:
a receiver, configured to receive N channels of bit signals, and
a processor, configured to: perform serial-to-parallel conversion on any one channel of the N channels of bit signals, to generate two channels of first bit signals, wherein N is a natural number greater than 1;
perform delay control on the two channels of first bit signals, to generate two channels of code bit signals, wherein the two channels of code bit signals differ by one clock cycle T, wherein a rate of the bit signals in the N channels of bit signals is 1/T, wherein a rate of the two channels of first bit signals is ½T;
perform quadrature amplitude modulation (QAM) mapping on the two channels of code bit signals and the other N−1 channels of bit signals, to generate a channel of quadrature electrical signal and a channel of in-phase electrical signal, wherein four quadrants of the in-phase electrical signal and the quadrature electrical signal are determined by bit values that correspond to the two channels of code bit signals at a same moment; and
modulate the quadrature electrical signal and the in-phase electrical signal, to obtain a transmit signal,
wherein performing delay control on the two channels of first bit signals to generate the two channels of code bit signals comprises: delaying either channel of the two channels of first bit signals by one clock cycle T, to generate a channel of the two channels of code bit signals, and using the other channel of the two channels of first bit signals as the other channel of the two channels of code bit signals, and wherein one channel of the two channels of code bit signals is delayed by one clock cycle T with respect to the other channel of the two channels of code bit signals.

2. A receiving apparatus, comprising:
a receiver, configured to receive a transmit signal, and
a processor, configured to: demodulate the transmit signal, to generate a channel of quadrature electrical signal and a channel of in-phase electrical signal;
perform QAM quadrature amplitude modulation demapping on the quadrature electrical signal and the in-phase electrical signal, to obtain N+1 channels of signals, wherein N is a natural number greater than 1, the N+1 channels of signals comprise two channels of code bit signals, and four quadrants of the in-phase electrical signal and the quadrature electrical signal are determined by bit values that correspond to the two channels of code bit signals at a same moment; and decode the two channels of code bit signals in the N+1 channels of signals, to generate a channel of bit signals, and use the channel of bit signals and other N−1 channels of signals as output signals, wherein the decoding the two channels of code bit signals in the N+1 channels of signals to generate a channel of bit signals, and using the channel of bit signals and other N−1 channels of signals as output signals comprises: performing parallel-to-serial conversion on the two channels of code bit signals in the N+1 channels of signals obtained by the determining module, to generate the channel of bit signals, and using the channel of bit signals and the other N−1 channels of signals as the output signals.

3. The receiving apparatus according to claim 2, wherein the demodulating the transmit signal, to generate a channel of quadrature electrical signal and a channel of in-phase electrical signal comprises: receiving the transmit signal sent by a sending apparatus, and performing frequency mixing on the transmit signal and a local-frequency signal, to generate a channel of quadrature analog signal and a channel of in-phase analog signal; and separately performing analog-to-digital conversion on the channel of quadrature analog signal and the channel of in-phase analog signal, to obtain the channel of quadrature electrical signal and the channel of in-phase electrical signal.

4. A receiving apparatus, comprising:
a receiver, configured to receive a transmit signal, and
a processor, configured to: demodulate the transmit signal, to generate a channel of quadrature electrical signal and a channel of in-phase electrical signal;
perform QAM quadrature amplitude modulation demapping on the quadrature electrical signal and the in-phase electrical signal, to obtain N+1 channels of signals, wherein N is a natural number greater than 1, the N+1 channels of signals comprise two channels of code bit signals, and four quadrants of the in-phase electrical signal and the quadrature electrical signal are determined by bit values that correspond to the two channels of code bit signals at a same moment; and
decode the two channels of code bit signals in the N+1 channels of signals, to generate a channel of bit signals, and use the channel of bit signals and other N−1 channels of signals as output signals,
wherein the decoding the two channels of code bit signals in the N+1 channels of signals to generate a channel of bit signals, and using the channel of bit signals and other N−1 channels of signals as output signals comprises:
delaying, by one clock cycle T, a channel of code bit signals that is not delayed in the two channels of code bit signals in the N+1 channels of signals obtained by the determining module, to obtain a channel of first code bit signals, and using the other channel of code bit signals of the two channels of code bit signals as the other channel of first code bit signals; and
performing parallel-to-serial conversion on the two first channels of code bit signals, to generate the channel of bit signals, and using the bit signals and the other N−1 channels of signals as the output signals.

5. A code modulation method, comprising:
receiving, by a sending apparatus, N channels of bit signals, and performing serial-to-parallel conversion on any one channel the N channels of bit signals, to generate two channels of first bit signals, wherein N is a natural number greater than 1;
performing delay control on the two channels of first bit signals, to generate two channels of code bit signals, wherein the two channels of code bit signals differ by one clock cycle T;
performing QAM quadrature amplitude modulation mapping on the two channels of code bit signals and the other N−1 channels of bit signals according to a preset QAM quadrature amplitude modulation mapping rule, to generate a channel of quadrature electrical signal and a channel of in-phase electrical signal, wherein four quadrants of the in-phase electrical signal and the quadrature electrical signal are determined by bit values that correspond to the two channels of code bit signals at a same moment; and
modulating the quadrature electrical signal and the in-phase electrical signal, to obtain a transmit signal,
wherein the performing delay control on the two channels of first bit signals, to generate two channels of code bit signals comprises:
delaying either channel of first bit signals of the two channels of first bit signals by one clock cycle T, to generate a channel of code bit signals; and
using the other first the two channels of first bit signals as the other channel of code bit signals.

6. A code demodulation method, comprising:
receiving, by a receiving apparatus, a transmit signal sent by a sending apparatus, and demodulating the transmit signal, to generate a channel of quadrature electrical signal and a channel of in-phase electrical signal;
performing QAM quadrature amplitude modulation demapping on the quadrature electrical signal and the in-phase electrical signal, to obtain N+1 channels of signals, wherein N is a natural number greater than 1, the N+1 channels of signals comprise two channels of code bit signals, and four quadrants of the in-phase electrical signal and the quadrature electrical signal are determined by bit values that correspond to the two channels of code bit signals at a same moment; and
decoding the two channels of code bit signals in the N+1 channels of signals, to generate a channel of bit signals, and using the bit signals and other N−1 channels of signals as output signals,
wherein the decoding the two channels of code bit signals in the N+1 channels of signals, to generate a channel of bit signals, and using the bit signals and other N−1 channels of signals as output signals comprises:
performing parallel-to-serial conversion on the two channels of code bit signals in the N+1 channels of signals, to generate the channel of bit signals, and using the channel of bit signals and the other N−1 channels of signals as the output signals.

7. The method according to claim 6, wherein the receiving, by a receiving apparatus, a transmit signal, and demodulating the transmit signal, to generate a channel of quadrature electrical signal and a channel of in-phase electrical signal specifically comprises:
receiving the transmit signal sent by the sending apparatus, and performing frequency mixing on the transmit signal and a local-frequency signal, to generate a channel of quadrature branch analog signal and a channel of in-phase branch analog signal; and separately performing analog-to-digital conversion on the channel of quadrature branch analog signal and the channel of in-phase branch analog signal, to obtain the channel of quadrature electrical signal and the channel of in-phase electrical signal.

8. A code demodulation method, comprising:

receiving, by a receiving apparatus, a transmit signal sent by a sending apparatus, and demodulating the transmit signal, to generate a channel of quadrature electrical signal and a channel of in-phase electrical signal;

performing QAM quadrature amplitude modulation demapping on the quadrature electrical signal and the in-phase electrical signal, to obtain N+1 channels of signals, wherein N is a natural number greater than 1, the N+1 channels of signals comprise two channels of code bit signals, and four quadrants of the in-phase electrical signal and the quadrature electrical signal are determined by bit values that correspond to the two channels of code bit signals at a same moment; and decoding the two channels of code bit signals in the N+1 channels of signals, to generate a channel of bit signals, and using the bit signals and other N−1 channels of signals as output signals, wherein the decoding the two channels of code bit signals in the N+1 channels of signals, to generate a channel of bit signals, and using the bit signals and other N−1 channels of signals as output signals comprises:

delaying, by one clock cycle T, one channel of code bit signals that is not delayed in the two channels of code bit signals in the N+1 channels of signals, to obtain a channel of first code bit signals;

using the other channel of code bit signals of the two channels of first bit signals as the other channel of first code bit signals; and performing parallel-to-serial conversion on the two first channels of code bit signals, to generate the channel of bit signals, and using the channel of bit signals and the other N−1 channels of signals as the output signals.

* * * * *

UNITED STATES PATENT AND TRADEMARK OFFICE
CERTIFICATE OF CORRECTION

PATENT NO. : 9,762,427 B2  Page 1 of 1
APPLICATION NO. : 15/295684
DATED : September 12, 2017
INVENTOR(S) : Yuanda Huang It is certified that error appears in the above-identified patent and that said Letters Patent is hereby corrected as shown below:

In the Claims

Column 22, Line 29, Claim 6 "using the other first the" should read -- using the other first bit signal of the --.

Column 22, Line 62, Claim 12 "specifically comprises:" should read -- comprises: --.

Signed and Sealed this
Sixth Day of February, 2018

Joseph Matal
*Performing the Functions and Duties of the*
*Under Secretary of Commerce for Intellectual Property and*
*Director of the United States Patent and Trademark Office*